United States Patent [19]

Tröger et al.

[11] 4,266,893

[45] May 12, 1981

[54] POSITIONER FOR ROTARY TOOL

[75] Inventors: Johannes Tröger, Radebeul; Gernot Läuter; Heinrich Spörl, both of Dresden, all of Fed. Rep. of Germany

[73] Assignee: Forschungsinstitut für Holztechnologie, Dresden, German Democratic Rep.

[21] Appl. No.: 951,875

[22] Filed: Oct. 16, 1978

[51] Int. Cl.³ .............................................. B23C 5/26
[52] U.S. Cl. ..................................... 409/206; 83/665; 409/231; 409/236
[58] Field of Search ............................. 90/11 A, 20.5; 51/166 TS; 408/714; 29/157.3 AH; 83/501, 504, 664, 665, 666; 409/14, 204, 206, 209, 212, 218, 231, 232, 234, 236

[56] References Cited

U.S. PATENT DOCUMENTS

| 970,915 | 9/1910 | Gebott | 83/665 |
| 1,199,836 | 10/1916 | Sweet | 51/166 TS |
| 2,677,312 | 5/1954 | Wenzel | 90/20.5 X |
| 3,899,948 | 8/1975 | Jakob | 83/665 X |

Primary Examiner—Z. R. Bilinsky
Attorney, Agent, or Firm—Karl F. Ross

[57] ABSTRACT

A rotary tool is rotationally coupled to but axially slidable along a shaft that is driven by a motor. This tool is biased axially in one direction by a compression spring on the shaft and in the opposite direction engages via a thrust bearing on a force-transmission member. A spindle threaded in the machine housing engages this force-transmission member via a ball centered on the axis so that when the spindle is screwed relative to the housing it can axially displace this force-transmission member against the force of the spring to position it.

6 Claims, 1 Drawing Figure

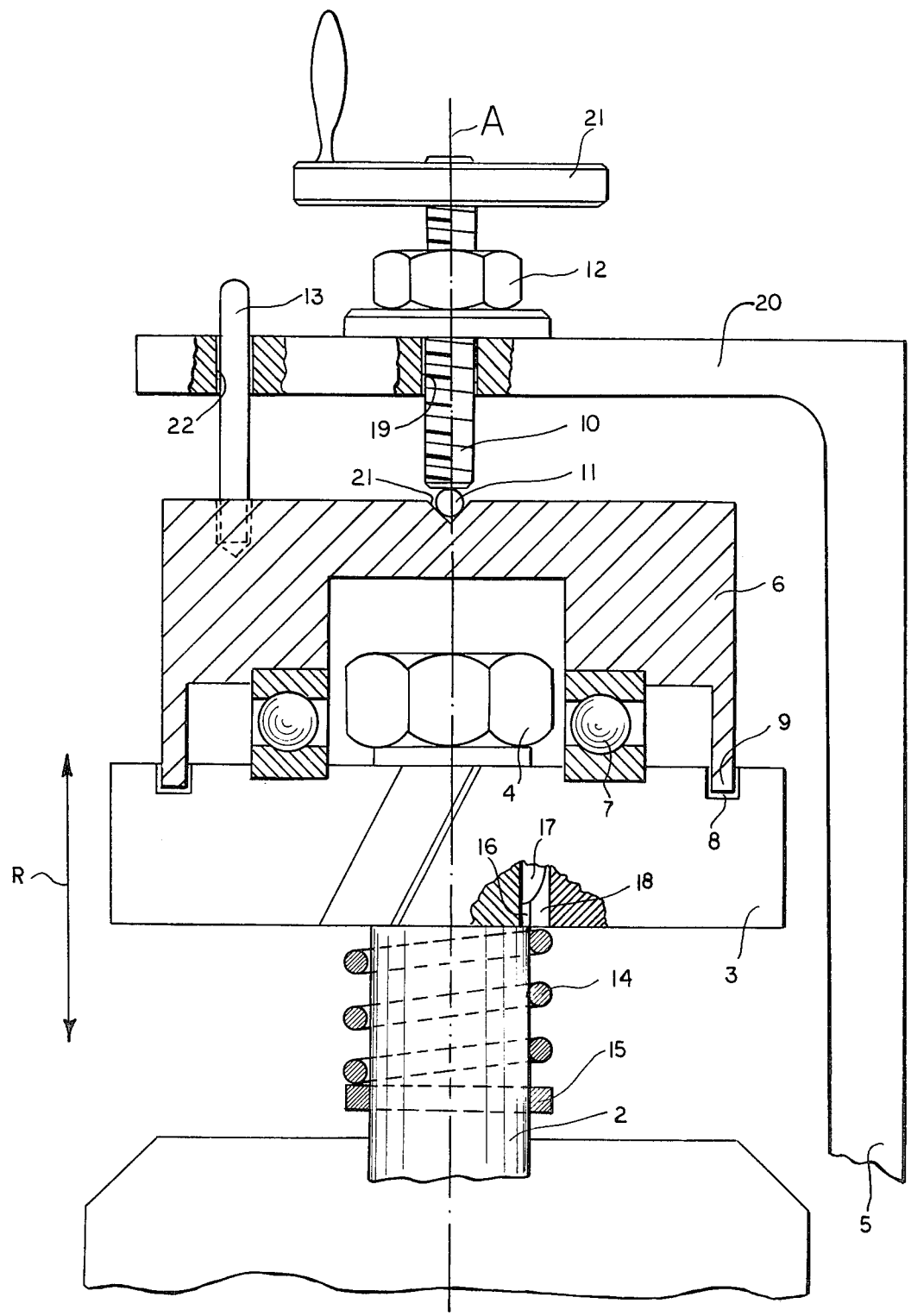

POSITIONER FOR ROTARY TOOL

FIELD OF THE INVENTION

The present invention relates to a positioner for a rotary tool. More particularly this invention concerns mechanism for positioning a rotary tool such as a milling or planing head along its rotation axis.

BACKGROUND OF THE INVENTION

It is occasionally necessary to at least limitedly move a tool such as a milling or planning head along its rotation axis relative to the support of the machine having the tool. To this end the spindle or shaft carrying the tool and defining the rotation axis therefor is normally mounted in bearings carried on a mount that itself can be displaced relative to the machine support. A threaded spindle engaging between the mount and the support and extending parallel to the shaft axis is rotatable about its own axis for the necessary axial adjustment.

The disadvantage of this system is that it is relatively complex and adds considerably to the cost of the machine. Furthermore unless the tolerances are extremely good in the positioning mechanism, some play will be present and vibration will result.

On simpler and normally less expensive tools it is standard practice simply to mount the tool on the shaft with interposition of a stack of spacer washers between the tool and holding nut on one side and a shoulder on the other. By removing spacers from one side and placing them on the other side of the tool it is possible to position this tool axially along the shaft within the limited range normally necessary for such machines. This is a relatively onerous operation and cannot be used to provide a stepless positioning of the tool on the shaft.

OBJECTS OF THE INVENTION

It is therefore an object of the present invention to provide an improved positioner for a rotary tool.

Another object is to provide such a positioner which is relatively simple in design and hence inexpensive to manufacture, yet which assures a stepless and vibration-free positioning of a tool.

SUMMARY OF THE INVENTION

These objects are attained according to the instant invention in a positioner comprising mounting means including at least one axially extending formation a keyway between the shaft and its tool for rotationally coupling the shaft and the tool and for axial displacement of the tool along the shaft. Biasing means is engageable between the tool and the support for urging the tool axially in one direction along the shaft and positioning means is provided between the support and the tool to bear axially in the opposite direction on the tool for displacing the tool in this opposite direction against the force of the biasing means.

Thus in a very simple manner the tool itself can be displaced axially along the shaft, yet at all times the tool remains firmly braced between the biasing means on the one side and the positioning means on the other. The device can therefore be produced at relatively low cost, yet will ensure a vibration-free mounting of the tool on the shaft.

According to further features of this invention the biasing means is a spring and the positioning means includes a threaded spindle aligned with the shaft axis and threaded into the machine support. This threaded spindle is rotatable for positioning, and is provided with a locknut for arresting it once the desired setting is obtained.

According to further features of this invention the positioning means further includes an axial thrust bearing and a force-transmitting element constituted as a force-transmission member and a spherical ball engaged axially between the one end of the spindle and the force transmitting member. Means is further provided in the form of an axially projecting and eccentric pin engaging between the member and the housing or support for preventing rotation of this force-transmission member. The spindle may therefore bear axially via the ball on the force-transmission member and therethrough via the axial-thrust bearing on the tool itself.

BRIEF DESCRIPTION OF THE DRAWING

The sole FIGURE of the drawing is an axial section through a positioner according to the instant invention.

SPECIFIC DESCRIPTION

As shown in the drawing a vertical planar has a fixed housing or support 5 on which is provided a drive having an output shaft 2 that can be rotated about its axis A at high speed. This output shaft 2 is formed with an axially extending keyway 16 having a key 17 engaging in another axially extending keyway 18 of a rotary planing tool 3. A nut 4 provided at the end of the shaft 2 prevents the tool 3 from coming axially off this shaft 2, and a compression spring 14 surrounding the shaft 2 is braced between the tool 3 and a snap ring 15 on the shaft 2 to bias the tool 3 axially away from the drive. Thus this tool 3 can move axially at least within the range indicated by the doubleheaded arrow R along the shaft 3. Absent any outside force acting in an axial direction against the force of the spring 14 the tool 3 will be pressed by this spring 14 against the nut 4.

The machine is provided with a positioning spindle 10 centered on the axis A and threaded in a bore 19 formed in an extension 20 of the support 5. This threaded spindle 10 is provided with a locknut 12 for arresting it, and with a handwheel 21 for manual rotation and, therefore, axial displacement of its lower end. A small ball 11 is received in a conical recess 21 centered on the axis A and formed in a force-transmitting member 6. The ball 11 received in this conical recess 21 is centered on the axis A and axially engages the lower end of the spindle 10. In turn the force-transmitting member 6, which is generally cup shaped, engages the upper race of an axial-thrust bearing 7 whose lower race is seated in the tool 3, and which is also centered on the axis A. The force-transmitting member has a skirt that surrounds and protects the axial-thrust bearing 7 and that has a rim 9 received in an annular circular groove 8 formed in the upper face of the tool 3. Furthermore a pin 13 parallel to but offset from the axis A has one end seated in the force-transmitting member 6 and another end extending through a hole 22 formed in the extension 20 of the housing 5.

Thus rotation of the spindle 10 clockwise by means of the handwheel 21 after loosening of the locknut 12 will displace the force-transmitting member downwardly. Rotation of the force-transmitting member is prevented by the pin 13, but its downward displacement will be transmitted through the thrust bearing 7 to the tool 3 to displace this tool 3 and compress the spring 14. Opposite rotation of the handwheel 21 will allow the spring 14 to expand and push the tool 3 upwardly. This arrangement operation can be carried out as easily during rotation of the tool 3 by the drive 1 as when the tool 3 is stopped.

The system according to the instant invention has few working parts and can be produced at relatively low cost. At the same time the addition of this positioner will not cause the machine to vibrate, as the only connection between the force-transmission member 6 and the tool 3 is through an axial thrust bearing and in the other direction the only connection between thrust bearing 6 and the spindle 10 is via a ball. The device will therefore be automatically self-centering on the tool and will normally have no effect on the normal operation of the machine.

I claim:

1. In an apparatus having a tool carried on an end of a tool shaft having and rotatable about a shaft axis relative to a support, the improvement comprising:
   mounting means including at least one axially extending formation between said shaft and said tool for rotationally coupling said shaft and said tool and for axial displacement of said tool along said shaft;
   a compression spring surrounding said shaft and braced axially between said tool and said shaft for rotating with said shaft and tool and for urging said tool axially in one direction along said shaft; and
   positioning means between said support and said tool having a threaded spindle extending on said axis toward said shaft and threadedly engaging said support, a force-transmitting element lying on said axis and having one side bearing axially in said one direction on said spindle and another side, and an axial-thrust bearing having one axial end bearing axially in said one direction on said force-transmitting element and another axial end bearing axially in the opposite direction on said tool against the force of said spring.

2. The improvement defined in claim 1 wherein said formation is a keyway formed in said shaft and said mounting means includes a key engaged in said keyway.

3. The improvement defined in claim 1 wherein said force transmitting element includes a force-transmission member and a ball, said member having one axial side axially bearing on said ball and therethrough on said spindle and another axial side bearing through said thrust bearing on said tool.

4. The improvement defined in claim 3 wherein said tool is formed with an axially open annular groove centered on said axis, said member having an axially projecting skirt surrounding said bearing and having a rim received in said groove.

5. The improvement defined in claim 3, further comprising means for preventing said member from rotating about said axis and for permitting said member to move axially.

6. The improvement defined in claim 5 wherein said means for preventing includes an axially extending pin offset from said axis and operatively engaged between said member and said support.

* * * * *